(12) United States Patent
Clendenon (10) Patent No.: US 6,567,785 B2
(45) Date of Patent: May 20, 2003

(54) ELECTRONIC BEHAVIOR MODIFICATION REMINDER SYSTEM AND METHOD

(76) Inventor: John Richard Clendenon, 805 Arlington Rd., Palmetto, FL (US) 34221

( * ) Notice: Subject to any disclaimer, the term of this patent is extended or adjusted under 35 U.S.C. 154(b) by 0 days.

(21) Appl. No.: 09/336,540

(22) Filed: Jun. 19, 1999

(65) Prior Publication Data

US 2002/0072959 A1 Jun. 13, 2002

(51) Int. Cl.[7] .............................................. G06F 17/60

(52) U.S. Cl. ......................................... 705/11; 368/89

(58) Field of Search ........................ 705/10, 11; 368/89

(56) References Cited

U.S. PATENT DOCUMENTS

| | | | | |
|---|---|---|---|---|
| 4,853,854 A | * | 8/1989 | Behar et al. | 364/413.01 |
| 5,184,707 A | * | 2/1993 | Van Horn et al. | 194/204 |
| 5,343,871 A | * | 9/1994 | Bittman et al. | 128/732 |
| 5,596,994 A | * | 1/1997 | Bro | 128/732 |
| 5,813,863 A | * | 9/1998 | Sloane et al. | 434/236 |
| 5,861,797 A | * | 1/1999 | Becker | 340/309.3 |

FOREIGN PATENT DOCUMENTS

WO    WO 98/25249 A2   *   6/1998

OTHER PUBLICATIONS

"Aids in Kicking the Smoking Habit" MMR v15 n4 p42. Jan. 12, 1998. [Dialog]. Retreived Jul. 18, 2002.*
Galt Technologies 1997 http://www.screensaverheaven.com/ssheaven/n0021,html.*
http://www.nicorette.co.uk/consumer.desktop.asp.*
http://home.earthlink.net/~phlextech/ss.html.*

* cited by examiner

Primary Examiner—Hyung-Sub Sough
Assistant Examiner—James A. Reagan
(74) Attorney, Agent, or Firm—Dorothy S. Morse (57) ABSTRACT

A discrete iterative and recursive operator reminder system and method for modifying recognized unwanted behavior, such as nail biting or poor posture. The system uses a combination of manual operator input and prior history to establish the timing of future prompting signals and lead a user successively to the desired result. It calculates the timing of each future prompting signal based upon the most recent operator response indicating whether the operator was engaged in the monitored behavior at the time of prompting signal generation. The system houses its microprocessor in a familiar object used for another purpose, such as a writing implement, wristwatch, or pocket-sized trinket, or is adapted for use within the programmed structure of a personal computer, cell phone, electronic notebook, pager, hand-held organizer, or other similar electronic device. The system may optionally display behavior related data, such as current date, time, progress graph, and average signal interval.

20 Claims, 6 Drawing Sheets

ELECTRONIC BEHAVIOR MODIFICATION REMINDER SYSTEM AND METHOD

RELATED PATENT APPLICATIONS

This patent application is a Continued Prosecution Application of the above-referenced utility patent application filed prior to May 29, 2000 by the same inventor for the same invention without adding new subject matter.

BACKGROUND

1. Field of Invention

This invention relates to self-administered training and behavior modification devices, specifically to a discrete operator-prompting reminder system and method that are iterative and recursive, using a combination of manual operator input and prior history to establish the timing of each next prompting signal. The device does not provide its user with a programmed schedule of future events, but instead calculates the timing of each next prompting signal based in part upon the most recent operator entry identifying whether the operator was engaged in the monitored behavior at the time the last prompting signal was generated. Therefore, each next prompting signal brings a user successively closer to the desired behavior modification goal, all the while adapting, even when the user has a "bad day". Applications may include, but are not limited to help in changing undesirable or unwanted behavior such as the correction of poor posture, cessation of nail biting, overcoming a tendency to pull on or twirl hair, reduction of elevated blood pressure levels, overcoming negative reactions to stress, improvement in attitude and a sense of well-being, and enhancing one's ability to concentrate or focus.

2. Description of Prior Art

A parent concerned about a child's future behavior, social acceptability, and general sense of well-being and self-worth is a valuable iterative instrument in conditioning the child and shaping the behavioral patterns that the child will carry forward into a successful adulthood. In essence, the reminding parent can continually assist a child in remembering to pick up and straighten the belongings in his or her room, stand up straight, use good manners while eating, stop nail biting, eat the proper foods for good nutrition, stop squirming, use socially acceptable language, be fiscally conservative, and the like, until the repetition yields results successively closer to the desired result of conditioning the child to function in a positive and productive manner. Although children may not always appreciate the constant reinforcement, they rely on it to learn acceptable behavior until they can become sufficiently self-disciplined to correct bad habits and undesirable behavior on their own. However, in spite of the best efforts of even the most concerned parents, most children will experience a variety of bad habits as they grow up and most will enter adulthood with at least a few which they have been unable to overcome. In addition, many adults become so busy in their daily lives that they are not able to find the extra energy or focus necessary to correct such bad habits or other recognized unwanted behavior without some assistance. These adults would benefit from a companion device that would take the place of a reminding or nagging parent and provide them with an automated reminder on a periodic basis to stop performing a selected type of behavior, which they consider undesirable and sincerely want to correct or improve, but have otherwise been unable to do so.

Many conditioning, memory enhancing, and behavior modification devices are known. They have been used for weight control, posture monitoring and training, diabetes management, sports training, timed medication dispensing, prenatal breathing control, pulmonary tract sensitivity testing, and swallowing rehabilitation. Some involve biofeedback where respiration or electrical impulses are measured and used as a basis for timing the next generated signal. Others provide for randomly generated prompting signals after which the operator may be offered one or more alternative choices of response behavior, and still others set target times and schedules for operator performance. However, none offer the iterative or recursive combination of continued adjustment and fine-tuning of interval length, while not allowing the user to anticipate a next signaling prompt, that leads the user ever closer to the desired behavior modification result. The prior art believed to be the most closely related to the present invention is the invention disclosed in U.S. Pat. No. 4,853,854 to Behar (1989). The Behar method and apparatus initially establishes baseline behavior for a user, then generates a fixed withdrawal schedule for the user. The only way for a user of the Behar invention to obtain any variation in the prompting schedule needed to adapt to newly encountered distractions not present during the baseline phase, would be to start over and reestablish a new baseline from which a different fixed schedule of events is then calculated. Through use of the Behar invention, the user is placed upon a time schedule of smoking events, being notified by the Behar device of the time when a "next smoke" is permitted. After the baseline phase, Behar provides one-way communication, with the machine telling the user when to engage in the undesired behavior. In contrast, the present invention remains in two-way communication with a user during the entire period of use. The Behar invention has distinct "baseline", "withdrawal", and "non-smoker" phases, as well as a "curfew" phase when a "don't smoke" icon is displayed. While this is convenient to smokers who crave a next smoke and must extend the time periods between smoking events or overcome habit, such an ever-increasing time between successive events will not necessarily be successful to stop hair pulling or the correction of poor posture. In the Behar invention, transfer from one phase to another is automatic, usually with the sounding of an audio signal to make the user aware of the transition. After the "baseline" data is collected, a schedule is set and remains fixed, the time interval only changing from that in the originally calculated schedule when the user smokes early, whereby the schedule from a given day may be repeated. Otherwise, the only way for a user of the Behar invention to obtain any variation in the prompting schedule needed to adapt to newly encountered distractions not present during the baseline phase, would be to start over and reestablish a new baseline from which a different fixed schedule of events is then calculated. The decision whether to repeat a day will be made by the Behar device according to the number of days to go in the schedule. Also, there are a limited number of restarts once the "non-smoker" phase is reached. The user is reminded of the next time to smoke through timely audio or visual signals. The Behar device can also have a display that identifies to a user the number of days left in the schedule and the time remaining until the next signal. In contrast, the present invention does not provide a schedule divided into "baseline", "withdrawal", and "non-habit" phases, in fact there is no fixed schedule at all. Instead, the present invention is iterative and recursive, with each next signaling prompt being calculated on the basis of a finite number of previous user responses, with the fluid, continual adaptation involved in the calculation of future signaling prompts successively bringing a user closer to his or her behavior modification goals. In the preferred embodiment of the present invention the time remaining until the next prompting signal is variable and purposefully remains an unknown factor for the operator so that he or she is not able to anticipate the next prompting signal and thereby skew the history available for use in determining the timing of future prompting signals. Instead of providing a non-variable withdrawal schedule once a baseline data collection phase, as in Behar, the present invention continuously updates the baseline data by incorporating each new operator entry into the prior history. Thus, each operator entry is an interactive response, that affects the timing of the next response, in contrast to the Behar response which at most allows repetition of one day in a fixed "days to go" schedule. Also, when the operator using the present invention reverses progress due to some distraction, the present invention remains iterative with the interval frequency of behavioral reminders being immediately decreased until the operator overcomes the distraction and again is able to make advancement toward cessation of the bad habit or unwanted behavior. This is not possible with the Behar invention, which has a predetermined schedule based upon a therapist's estimate of what would be appropriate for a typical person on a theoretical typical day. Therefore, success with the Behar largely depends on luck and compatibility of programmer and user. The present invention is not a best trend with a pre-established "one-size-fits-all" schedule. If a user is honest with his or her response input to the present invention, success is almost certain. Also, the present invention permits immediate use toward achieving a targeted behavior modification goal, not requiring a waiting period to establish a baseline from which a fixed schedule can be calculated. Use of the Behar invention would be comparable to a parent placing a series of notes on a calendar, refrigerator, or bathroom mirror to remind a child to alter behavior when the parent is not physically present, whereas use of the present invention is comparable to an interactive parent ever watchful of a child, who subconsciously monitors behavioral trends in the child and calculates an appropriate interval to administer the next reminder, with the child's success increasing the time interval to a next reminder. No other self-administered behavior modification device is known that functions in the same iterative and recursive manner as the present invention and provides all of its advantages.

SUMMARY OF INVENTION—OBJECTS AND ADVANTAGES

It is the primary object of this invention to provide a system and method which can be used in place of a reminding parent for iterative and recursive training or conditioning of people to modify behavior that they recognize as undesirable and want to correct. It is also an object of this invention to provide a behavior modification system and method which is uncomplicated and easy to use so that people will not become frustrated with it and abort their efforts prior to accomplishing their objective. A further object of this invention is to provide a behavior modification system which is presented in the form of an object or device that its operator is likely to have close at hand during the behavior modification period, such as a wristwatch, a pocket watch, a lightweight and aesthetically pleasing pocket-sized trinket or keepsake, a piece of jewelry configured for attachment to clothing, or a commonly used hand-held object such as a writing implement or a key chain, to make its use both easily portable and discrete, or in the alternative for the system to be adapted for use with an electronic device commonly used during work hours, such as a personal computer, hand-held electronic organizer, electronic notebook, cell phone, pager, or laptop computer. It is also an object of this invention to provide a behavior modification system which can provide an operator-prompting signal through a variety of discrete means that include audio, visual, or vibrational signals, and combinations thereof. It is a further object of this invention to provide a behavior modification system which is not easily disengaged by the operator so that the operator is not easily tempted to turn it off before the desired level of correction for the unwanted behavior is achieved. It is also an object of this invention to provide a behavior modification system having a configuration which can be cost effectively manufactured in both disposable and non-disposable forms. It is a further object of this invention to provide a behavior modification system having uninterrupted operation during a typical behavior modification period expected for an average adult without the need for replacement or power source renewal.

As described herein, properly manufactured arid used, the present invention would provide a discrete method and operator prompting system that is iterative and recursive, and can be used to modify many types of unwanted behavior. The prompting system would use a combination of the most recent operator input and prior history to establish the timing of a next prompting signal. A relatively long period of prior history is preferred so that the operator is not too severely set back if he or she has a "bad day." The system does not provide its user with a programmed schedule of future events, but instead calculates the scheduling of each next prompting signal based in part upon the most recent operator entry identifying whether the operator was engaged in the monitored behavior at the time the last signal was generated to successively lead a user closer to the desired behavior modification result. Also, the present invention is not like a biofeedback system where the user affects the frequency interval of a machine response. Instead, the reverse occurs where the machine affects the frequency interval of a human response. Should no operator input be received, the interval for next signal generation would remain the unchanged. The system would either comprise a microprocessor housed in a hard outer protective covering that is compact, lightweight, aesthetically pleasing, easily portable, and discretely configured as a commonly carried item having another functional purpose, such as a writing implement, a pocket-sized trinket or keepsake, a wristwatch, a pocket watch, a piece of jewelry configured for attachment to clothing, or a key chain, or in the alternative the system would be adapted for use with a commonly used electronic device including but not limited to a desk-top personal computer, an electronic notebook, an electronic hand-held organizer, a cell phone, a pager, or a laptop computer. It is important that the housing be configured as an object that the operator would be likely to keep close at hand during a routine work day when the operator would otherwise be distracted and not thinking about overcoming unwanted behavior. When the present invention has a battery power source and is not a disposable unit, its housing should provide an easily accessible means for rapid battery replacement, such as an easily releasable sliding cover or a threaded cap. After initializing the system, the operator would be provided with a succession of prompting signals at unanticipated times, each calculated according to prior success or failure in avoiding the targeted unwanted behavior. Although its operator would be able to turn off the present invention whenever desired by a multiple step shut down procedure, the shut down procedure would be purposefully extended or complex so that turning off the present invention becomes a conscious operator decision and not an unthinking reflex. Thus operators are given more of an opportunity to reverse a shut down decision made prior to achieving the desired level of behavior correction, before the last of the multiple steps is completed. In the preferred embodiment, if the operator is engaged in the unwanted activity at the time a prompting signal is generated and indicates so by providing appropriate response input to the system, the interval for the next prompting signal would be shortened. In the preferred embodiment the amount of shortening would be variable so that the operator does not skew the history for determination of next prompt signals by anticipating them. Variability associated with the time intervals between prompting signals would also more closely resemble the unpredictability of a reminding parent, however, the device would also function effectively as a reminder to teach a person to overcome a targeted bad habit even if that person were to anticipate one or more prompting signals. Although not critical, the system could also be configured for various useful visual displays, such as but not limited to the current date, the current time, a progress graph, or the average recent interval between generated signals based upon an established number of recent operator responses to let the operator know whether the unwanted behavior is diminishing or becoming more pronounced. Power source conservation in the present invention is promoted by simple operator responses and automatic rolling display of the current date, current time, progress graph, and average recent interval between generated prompting signals during a short period of time unless the operator interrupts the automatic display to re-set the date or time. Since the present invention relies on honest operator response, its use is limited to behavior recognized by the operator as unwanted, and for which the operator would have a sincere desire for improvement. Simultaneous monitoring of more than one unwanted behavior is also considered to be within the scope of the present invention. If the present invention is non-disposable, renewing the factory default settings for the monitoring of a new unwanted behavior could be accomplished by conscious command or removal and subsequent replacement of the power source. In the alternative, if the present invention is disposable, renewal of the factory default settings for new operator behavior modification use could only be accomplished by conscious command.

The description herein provides preferred embodiments of the present invention but should not be construed as limiting the scope of the iterative and recursive reminder device invention. For example, variations in the dimension and configuration of the housing used; the type of signaling method used, whether it is visual, audio, vibrational, or a combination thereof; the configuration, number, and positioning of response/set buttons used; the type of display graph used; the order in which the date, time, progress graph, and average recent signal interval are displayed; and the factory default setting used for its sleep mode, other than those shown and described herein, may be incorporated into the present invention. Thus the scope of the present invention should be determined by the appended claims and their legal equivalents, rather than the examples given.

DETAILED DESCRIPTION OF PREFERRED EMBODIMENTS

The preferred embodiment of the present invention offers an operator (not shown) a discrete method and prompting device for use in assisting the modification of recognized unwanted behavior. Since the prompting device acts simply as a reminder, in a manner similar to a reminding or nagging parent, the operator must have a sincere desire to correct the unwanted behavior and make honest responses for successful results to be achieved. The prompting device is iterative and recursive, and uses a combination of recent manual operator input and extended prior history to establish the timing of a next prompting signal and lead a user successively closer to a desired behavior modification result. After utilization, a relatively long period of prior history is preferred, such as fifty to several hundred operator responses, so that the operator is not unduly penalized for one "bad day" when he or she is otherwise distracted from behavior modification goals. The device does not provide its user with a programmed schedule of future events, but instead is recursive and calculates the timing of each next prompting signal based upon the most recent operator response identifying whether the operator was engaged in the monitored behavior at the time the last prompting signal was generated. In the preferred embodiment it is contemplated that the present invention be compact, lightweight, easily portable, and discretely configured as a commonly carried item having another functional purpose. However, it is also contemplated for a substantially similar reminder system to be used with electronic devices commonly used by a person during a typical work day, such as but not limited to desk-top personal computers, hand-held electronic organizers, electronic notebooks, cell phones, pagers, and laptop computers. The housing of the present invention should not be readily identifiable by its configuration as a behavior modification device as some operators might be self-conscious or embarrassed to have others learn about their behavior modification goals, particularly those goals involving undesirable bad habits. Although not critical, as a further measure of assistance to the operator it is also intended that an extended or laborious shut-down process be incorporated into the present invention so that the operator is not easily tempted to turn it off prior to accomplishing his or her behavior modification objectives. After initializing the present invention, the operator would receive successive prompting signals from it at differing intervals. If the operator is engaged in the unwanted activity at the time of prompting signal generation and indicates so by providing appropriate response input, the interval for the prompting next signal would be shortened by a variable amount of time so that the operator does not skew the history for determination of the next prompting signal by anticipating it. The variability factor is not critical however, since it is expected that the present invention would also function effectively as a reminder to teach a person to overcome a targeted bad habit even if that person were to anticipate next prompting signals by the fact that the operator would have to enter a response. Should the operator not be engaged in the unwanted activity at the time of prompting signal generation and indicate so by providing appropriate response input, the interval for the next prompting signal would be lengthened. Should no operator input be recorded, the interval would remain unchanged. Although it is preferred that the present invention monitor one unwanted behavior at a time, it is considered within the scope of the present invention to have the capability of monitoring two or more unwanted behaviors at once. A significant advantage of the present invention is its fluid and continual modification of the time interval needed for successive signaling prompts to provide an affordable, self-administered approach to behavior modification goals that are not a therapist's estimate of arbitrary signaling intervals for a typical person on a theoretically typical day.

Figure 1A:
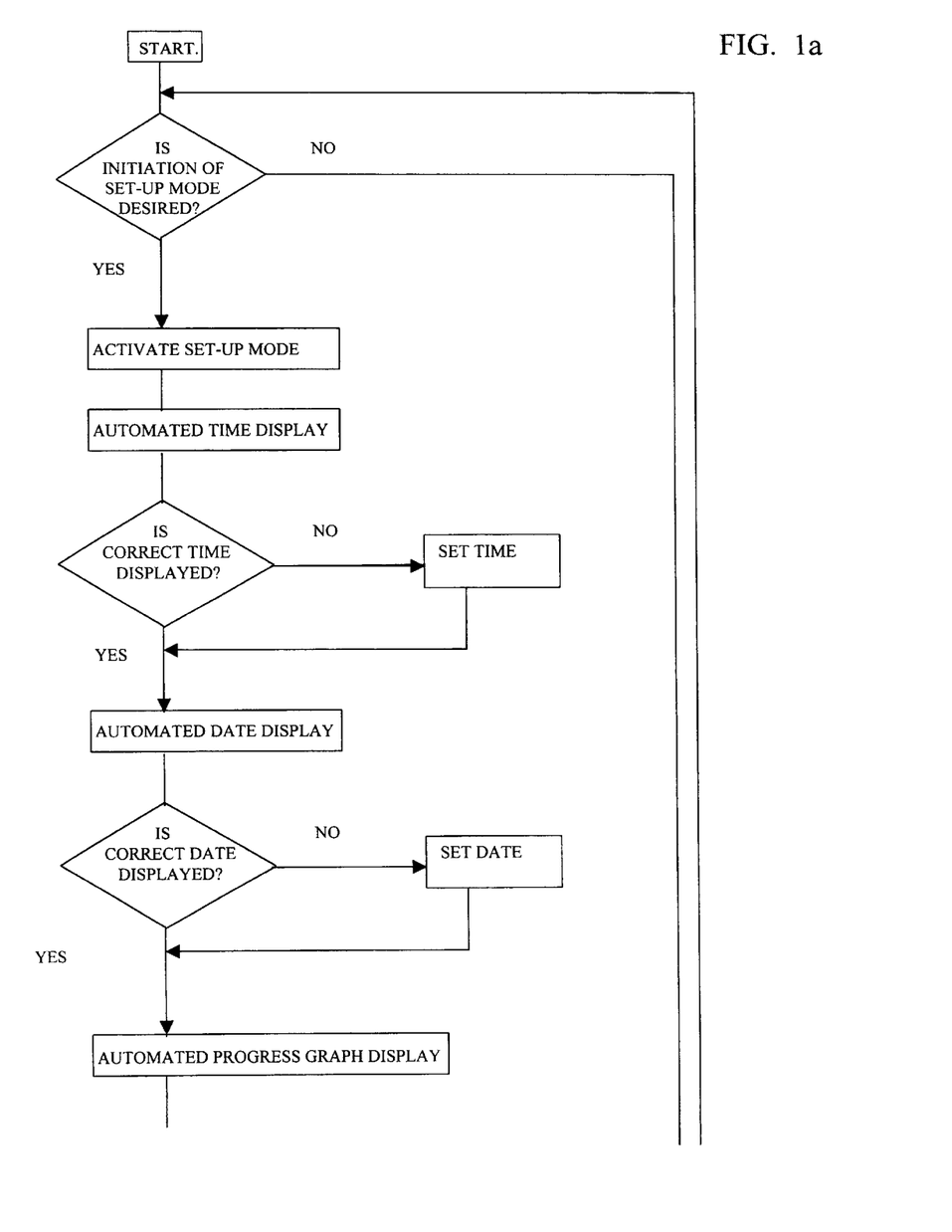
FIG. 1 is a flow chart of the steps involved during routine use of the most preferred embodiment of the present invention.
Figure 1B:
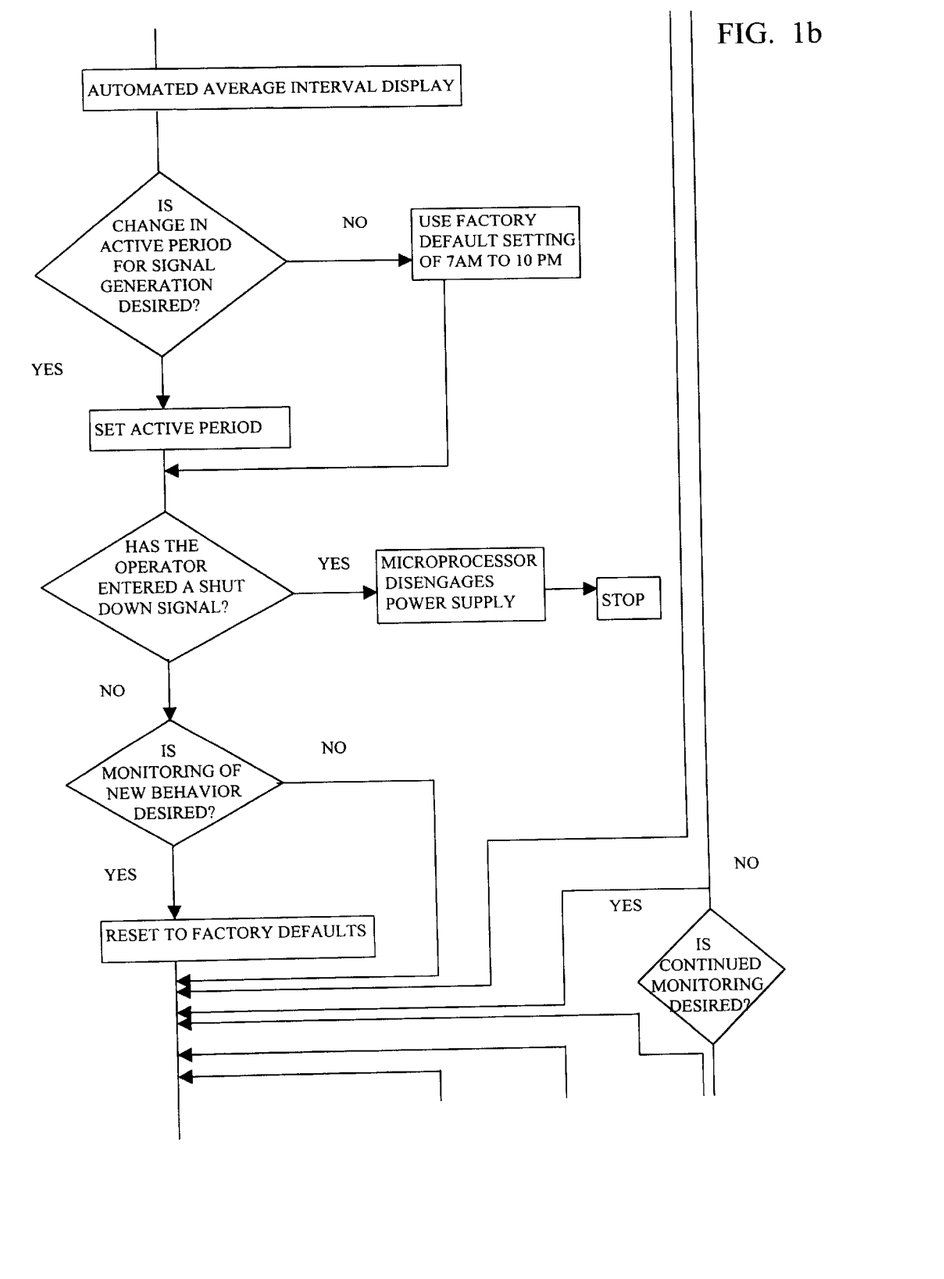
Figure 1C:
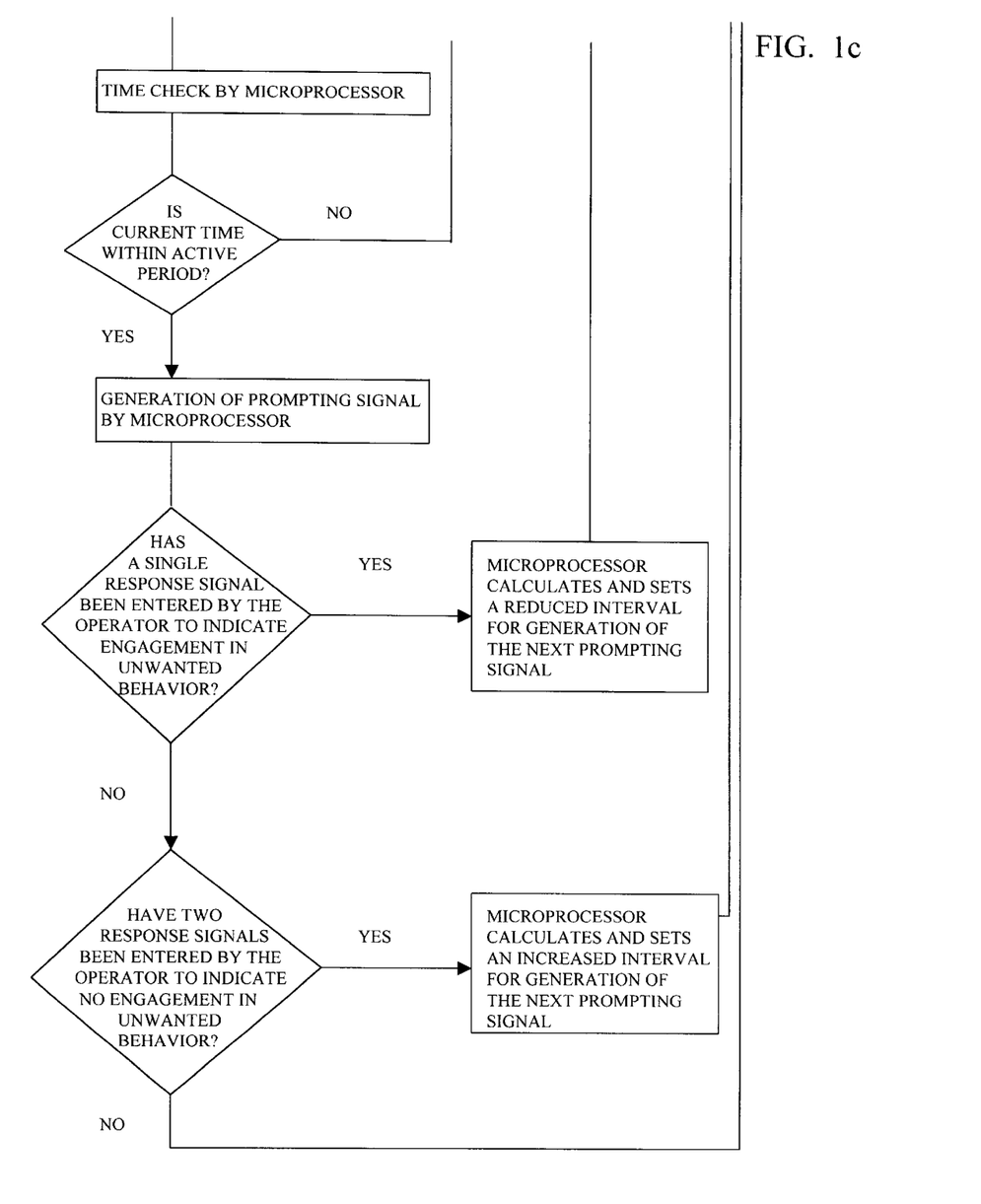

In flow chart format FIG. 1 shows the steps contemplated for use by one preferred embodiment of the present invention. An operator would first initialize the system, probably by depressing a button, such as the response/set button identified by the number 8 in FIGS. 2–5. Once the system is activated, the operator would then have to choose whether to enter a set-up mode. Although in its simplest form the present invention would not require a set-up mode, for operator convenience in setting a designated active time for prompting signal generation, and for the customized display of behavior modification related information, use of a set-up mode is preferred. Operator input commanding bypass of the set-up mode would be required if entry into the set-up mode is not desired. In the preferred embodiment it is contemplated for the set-up mode to include the automatic display over a short period of time of several different types of information relevant to behavior modification, to include but not be limited to, time of day, current date, and progress data. To bypass the set-up mode and go directly into a prompting signal generation mode, the operator would have to input an appropriate command, such as the depressing of a designated response/set button or key a predetermined number of times or a predetermined length of time, or the simultaneous or sequential depressing of multiple response/set button or keys. Since it is contemplated for use of the present invention to be user-friendly and uncomplicated, one or more acts of depressing response/set button 8, or the act of selectively depressing one of two concentric response/set buttons, such as those shown in FIG. 6 by the numbers 8 and 22, would be considered an appropriate set-up mode bypass command. If a bypass command is not made and the set-up mode is automatically activated, in the preferred embodiment it is contemplated for various forms of information to be provided to an operator, such as the time display shown in FIG. 2 as number 6, the date display shown in FIG. 3 as number 12, the progress graph display shown in FIG. 4 as number 16, and the average recent signal interval display shown in FIG. 5 as number 20. Although it is considered within the scope of the present invention to include commanded access to each type of information displayed, in the most simplified preferred embodiment time display 6, date display 12, progress graph 16, and average recent signal interval display 20 would be displayed in rolling succession on an LCD screen during a time period of approximately one-and-one-half seconds. An operator desiring to set a current time or date would have to actively interrupt the rolling display by depressing a response/set button or key, such as response/set button 8, to do so. Although not shown in FIG. 1, it is contemplated for other embodiments to allow operator input for changing the type of graph displayed and the number of recent intervals used for calculation of recent signal interval display 20. Also, although other alternatives are considered within the scope of the present invention, in the preferred embodiment progress graph 16 would be in the form of a bar graph or a line graph, a maximum of four signal intervals would be displayed in graph form, and the number displayed in display 20 would be calculated as the average of a predetermined maximum number of recent signal intervals, such as fifteen or twenty.

After the preliminary information in the set-up mode is displayed, the operator would be given an opportunity to reset or restore the present invention to factory default settings for use in modifying a new unwanted behavior or for allowing another operator to borrow it. If the present invention is non-disposable, renewing the factory default settings for the monitoring of a new unwanted behavior could be accomplished by conscious command or the removal and subsequent replacement of its power source. In the alternative, if the present invention is disposable, renewal of the factory default settings for new operator behavior modification use could only be accomplished by conscious command. The preferred embodiment then contemplates the use of an automatically engaged active period of signal generation which can either be individually set for a customized time period and duration, or a factory default setting can be used. In the preferred embodiment the factory default setting would be approximately from six or seven in the morning until nine or ten at night, although other time periods are also considered within the scope of the present invention. Once the active period is set, the operator would be given an opportunity to enter a shut down signal to disengage the power supply. In the preferred embodiment it is contemplated for the shut down procedure to be a multiple step procedure, purposefully complex or extended so that turning it off becomes a conscious operator decision and not an unthinking reflex. Thus operators are given more of an opportunity to reverse a shut down decision prior to achieving the desired level of behavior correction. As restoration of factory default settings is accomplished by a separate procedure, entering a shut down signal would not cause the prior history information stored in the present invention to be lost.

After the operator is given the opportunity to indefinitely shut down the present invention and he or she chooses not to do so, automatic prompting signal generation would occur as long as the information shown on current time display 6 was within the designated active period. Therefore, prior to the generation of each prompting signal, the microprocessor of the present invention, identified by the number 28 in FIG. 7, would check current time 6 to see if it was within the active period. If not, microprocessor 28 would subsequently check current time 6 at pre-set intervals and cause a prompting signal to be generated once the active time period was reached. Although not shown in FIG. 1, a time delay circuit would probably be used by microprocessor 28 to space apart individual acts of monitoring current time 6. The current time 6 monitoring interval could be a predetermined time period of a few minutes duration or a longer time period lasting twenty or thirty minutes.

Figure 7:
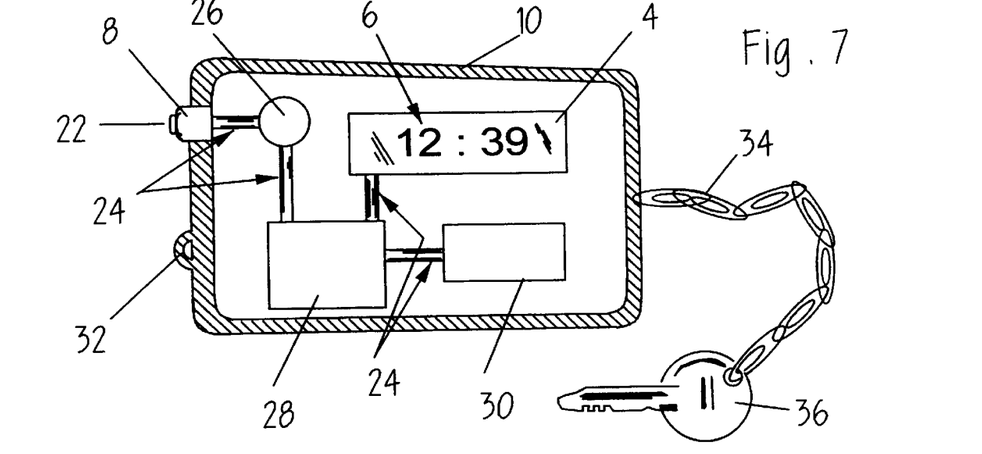
FIG. 7 is a sectional view of one possible configuration of the internal components in the second embodiment of the present invention.

Once current time 6 is determined to be within the active period, microprocessor 28 would use a predetermined number of prior prompting signal intervals to calculate the timing of a next prompting signal. Although it is considered within the scope of the present invention for the prior history used to calculate the time for generation of a next prompting signal to range between one and several hundred prior operator responses, in the most preferred embodiment it is contemplated for between fifty and one hundred prior operator responses to be used so that several responses in one "bad day" do not unduly penalize an operator after several months of behavior modification progress. However, after several successive "bad days" the present invention will automatically adjust future time intervals to reverse a trend of "bad days" to promptly redirect a faltering user back again toward his or her desired behavior modification goal. Initially, a predetermined interval for first prompting signal generation could be factory set. The factory default setting could also be selected for use to begin the modification of a new unwanted behavior by the same operator or a new one. In the preferred embodiment a predetermined first interval would not exceed two hours. A first interval after an inactive period could be determined in several ways. The interval calculated for a next prompting signal at the time of shut down or entry into an inactive period could be saved into memory for use after reactivation as the first prompting signal. In the alternative, the unused portion of the saved interval at the time of shut down or deactivation could be used, or the preferred embodiment could automatically default to the initial factory set interval after deactivation or shut down. If the initial factory set interval or the remaining portion of a previously calculated interval is used, neither should be used by microprocessor 28 in the calculation of a next prompting interval or the recent signal average. After a prompting signal has been generated, an operator would have three choices, to enter a negative response indicating that no unwanted behavior was occurring at the time of prompting signal generation; to enter a positive response indicating that unwanted behavior did occur at the time of prompting signal generation; and to enter no response. After a negative operator response, microprocessor 28 would calculate and set an increased interval for generation of a next prompting signal and after a positive operator response, microprocessor 28 would calculate and set a reduced interval for generation of a next prompting signal. If no operator response was entered the interval would remain unchanged. A factory default setting of a maximum time between prompting signals would be required and in the preferred embodiment would be set at either two or three hours so that at least a minimum of four to five prompting signals would be given to an operator in each active time period exceeding eight hours during the beginning stages of behavior modification. As unwanted behavior improves, prompting signals may occur only once or twice a day. A factory default maximum time delay setting would also be needed for the determination of whether an operator response was received, such as a time period of eight to ten seconds. Since it is contemplated that the system would be readily accessible to the operator at all times during the active period, a longer time period for operator response should not be necessary, although it is still considered within the scope of the present invention to have operator response settings exceeding 10 seconds. If after a prompting signal the operator does not enter the expected positive or negative response, the operator would have an option to initiate the set-up mode for modifying any changeable settings or indefinitely shutting down the system. In the preferred embodiment for simplicity of operation it is contemplated for continued monitoring to be automatic. However, if continued monitoring is not desired the operator must enter both a set-up mode command and a separate shut down signal to stop the generation of prompting signals. A simple shut down procedure is not preferred so that shut down occurs as the result of a conscious operator decision and not the inadvertent striking of a single button or key. Although not limited thereto, the operator continuously holding down a selected response/set button or key for a period of three to five seconds would be one way in the preferred embodiment in which the operator could indicate a desire to enter the set-up mode after prompting signal generation. In the alternative, the present invention could be made to allow operator entry of a set-up mode command at any time for the convenience of those having more self-control, or such signal entry could be restricted to the time immediately after a prompting signal for those needing more help in achieving their behavior modification goals. Although it is contemplated for use of the present invention to be easy and uncomplicated so that the act of depressing a response/set button 8 one or two times might be all that is needed to maintain the generation of prompting signals and plot behavior modification progress, it is generally contemplated for operator disengagement of the present invention to be lengthy or otherwise laborious to discourage operators from easily turning off the prompting signal before behavior modification goals are achieved. Although not shown in FIG. 1, it is also considered within the scope of the present invention for an operator to simultaneously use two independent embodiments of the present invention to improve two separate unwanted behaviors. The two independent behavior modification systems could comprise separate housings 2, 10, 14, or 18, or be placed into the same such housing. Further, it is also contemplated for the present invention to include a single microprocessor 28 with the capability of calculating next intervals for two separate prompting signals and a prompting signal emitting device 30 configured to emit at least two distinctive prompting signals so that a single discrete housing 2, 10, 14, or 18 could be used as a behavior modification reminder for more than one unwanted behavior at a time.

Figure 2:
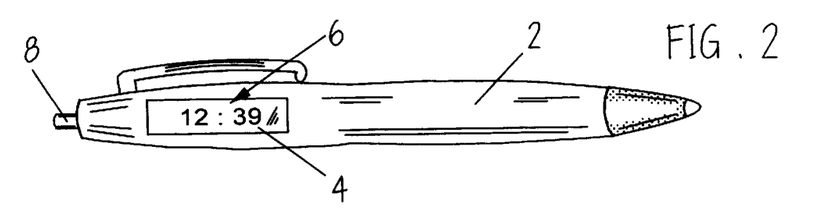
FIG. 2 is a side view of a first preferred embodiment of the present invention having the configuration of a writing implement and displaying current time on its display panel.
Figure 3:
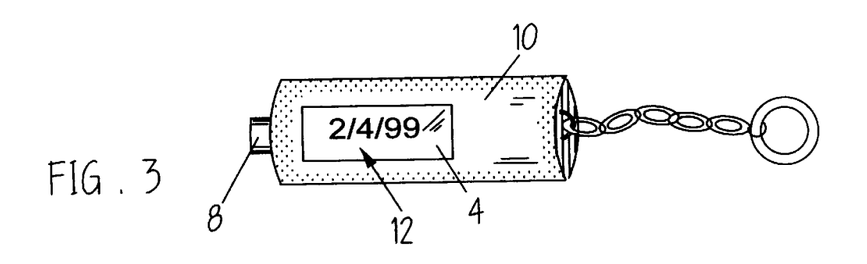
FIG. 3 is a side view of a second preferred embodiment of the present invention having the configuration of a key chain and displaying a date on its display panel.

FIGS. 2–5 show the present invention having various discrete configurations in the form of objects commonly or easily carried by an operator (not shown) which are configured for a functional purpose other than behavior modification so that it is not immediately obvious to other in the immediate vicinity of the user that the user is undergoing behavior modification for unwanted or undesired bad habits. FIG. 2 shows a first preferred embodiment of the present invention having a housing 2 shaped as a writing implement. In addition to being employed as a reminding device, it is also contemplated that the first embodiment would be fully functional as a pen or mechanical pencil. FIG. 2 also shows the present invention having a response/set button 8 on one of the ends of housing 2 and a display panel 4 positioned through housing 2. Although preferred, the use of display panel 4 is not critical. FIG. 2 shows a current time display 6 on display panel 4. In the first preferred embodiment it is contemplated for response/set button 8 to be depressed one or more times by an operator to provide response to each next prompting signal generated at time intervals calculated by the microprocessor within housing 2, shown by the number 28 in FIG. 7. Although not critical, in all embodiments after the set-up mode is accessed, it is contemplated that display panel 4 would be defaulted to current time display 6. FIG. 3 shows a second preferred embodiment of the present invention having a key chain shaped housing 10, a response/set button 8 on one of its ends, and a display panel 4 positioned through housing 10. FIG. 3 shows a current date display 12 on display panel 4. In the first preferred embodiment it is contemplated for response/set button 8 to be depressed one or more times to provide a data input signal, command signal, or prompting signal response to the microprocessor 28 within housing 10.

Figure 4:
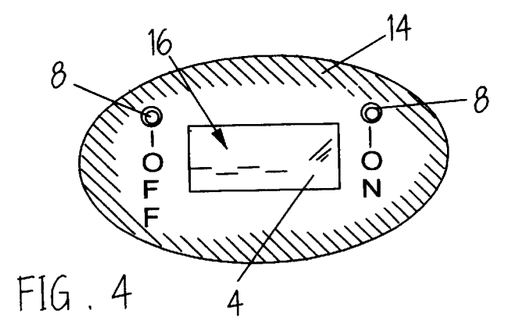
FIG. 4 is a side view of a third preferred embodiment of the present invention displaying a progress graph on its display panel and having the configuration of an egg-shaped keepsake which can be maintained in a pocket, or placed on a nearby table or desk.
Figure 5:
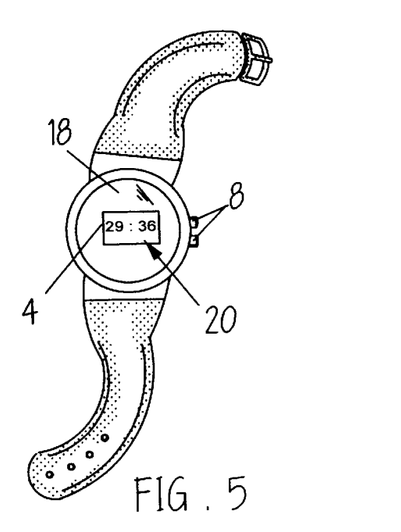
FIG. 5 is a side view of a fourth preferred embodiment of the present invention having the configuration of a wristwatch and displaying an average recent signal interval on its display panel.

FIG. 4 shows a third preferred embodiment of the present invention having an oval paperweight, trinket, or keepsake type of housing 14, display panel 4 positioned through housing 14, and two response/set buttons 8 one on either side of display panel 4. FIG. 4 shows a progress graph display 16 on display panel 4. In the third preferred embodiment it is contemplated for varying combinations of response/set buttons 8 to be depressed one or more times to provide a data input signal, command signal, or prompting signal response to the microprocessor 28 within housing 14. FIG. 5 shows a fourth preferred embodiment of the present invention having a wristwatch housing 18, display panel 4 positioned through housing 8, and two response/set buttons 8 through housing 18 on one side of display panel 4. FIG. 5 shows an average recent interval 20 on display panel 4. As shown in FIGS. 8–15, other embodiments of the present invention could similarly be discretely configured as, or otherwise incorporated into, items of jewelry, pocket watches, pagers, cell phones, laptop computers, hand-held electronic organizers, electronic notebooks, desk-top personal computers and the like.

Figure 6:
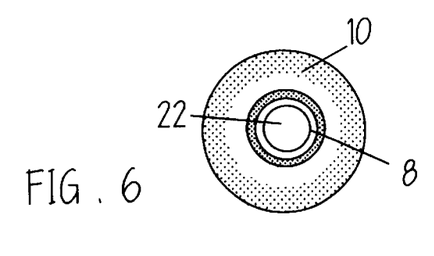
FIG. 6 is an end view of the second preferred embodiment of the present invention having two concentric response/set buttons.

FIG. 6 shows the second preferred embodiment of the present invention having response/set button 8 and an inner response/set button 22 both concentrically positioned through one end of housing 10. The act of depressing response/set button 8 once or multiple times, inner response/set button 22 once or multiple times, or both buttons 8 and 22 simultaneously or in a specific consecutive order, would create operator input signals, command signals, and prompting signal responses for microprocessor 28. In the alternative, multiple response/set buttons 8 could be used, such as is shown in FIGS. 4 and 5, or a single response/set button as shown in FIG. 2. Although more than two buttons 8 and 22 could be used and are considered within the scope of the present invention, since simplicity of operation is one of its objectives the use of only one or two buttons 8 and 22 would be preferred.

FIG. 7 shows one preferred embodiment of the inner components needed for successful operation of the second preferred embodiment of the present invention. FIG. 7 shows housing 10 attached to one end of a chain 34, the other end of chain 34 being attached to a key 36. On the end of housing 10 opposed from chain 34, FIG. 7 shows a loop 32 attached to the outside surface of housing 10 for use in suspending housing 10 from a nail or hook (not shown) between uses and during use so that the second embodiment can easily and rapidly be located after prompting signal generation for operator response. FIG. 7 shows response/set button 8 and inner response/set button 22 secured through housing 10 in a position adjacent to loop 32. However, it is also contemplated for response/set button 8 and inner response/set button 22 to be positioned anywhere on housing 10 that they would be easily accessed by an operator (not shown). FIG. 7 also shows a power supply 26, a microprocessor 28, a signal emitter 30, and display screen 4 having current time 6 thereon each positioned within housing 10, with electrical wiring 24 connected between power supply 26 and both response/set button 8 and inner response/set button 22; as well as between power supply 26 and microprocessor 28, microprocessor 28 and signal emitter 30, and microprocessor 28 and display screen 4. In the embodiment shown in FIG. 7 it is contemplated for microprocessor 28 to comprise timing circuitry (not shown). However, in absence of such timing circuitry, a separate timer, or a timer and a clock would be needed for the present invention to properly function. At a minimum, microprocessor 28 in the preferred embodiment shown in FIG. 7 would need to have adequate circuitry and be programmed to calculate at least one next prompting signal interval and activate signal emitter 30 when the end of the interval arrives; react to operator responses, entered data, and commands; automatically cause display of current time, current date, and behavior modification data when the system is first activated unless an operator command is received to by-pass such display; and check current time to see if it is within the active period set for prompting signal generation. Also in the preferred embodiment, although not critical, it is contemplated for display screen 4 to be an LCD panel and for signal emitter 30 to either create audio, visual, and/or vibrational signals for an operator, or a combination thereof. Although not critical to the present invention, power saving circuitry and wiring would be desired when considered cost effective. Housing 10 could be made as a disposable unit of inexpensive materials, such as plastic, so that it could be discarded after a period of time, for example a time period not to exceed one year. In the alternative, housing 10 could be made from more expensive materials as a non-disposable functional object or keepsake, whereby housing 10 would include a simple means by which power supply 26 could be replaced, such as a sliding cover or a threaded cap (not shown). It is contemplated for power supply 26 to comprise technology that would allow use during a minimum time period expected for a typical adult to change or improve an unwanted behavior.

Figures 8, 9, 10:
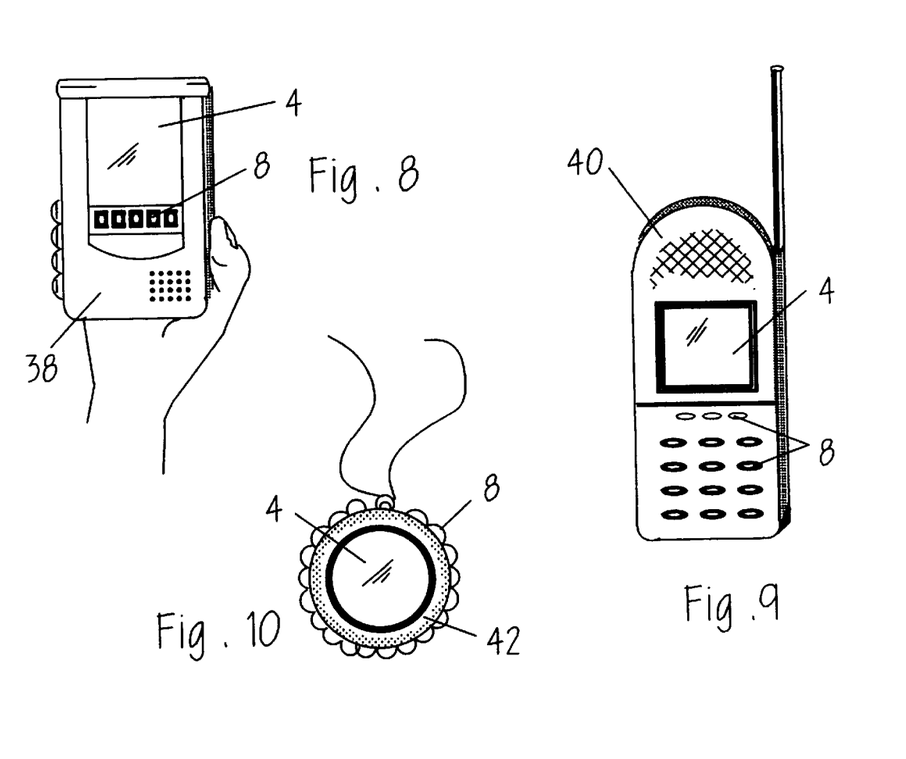
FIG. 8 is a front view of an alternative housing for the present invention having the configuration of a hand-held electronic organizer.
FIG. 9 is a front view of an alternative housing for the present invention having the configuration of a cellular telephone.
FIG. 10 is a front view of an alternative housing for the present invention having the configuration of a piece of jewelry suspended from a chain or cord.
Figures 11, 12, 13:
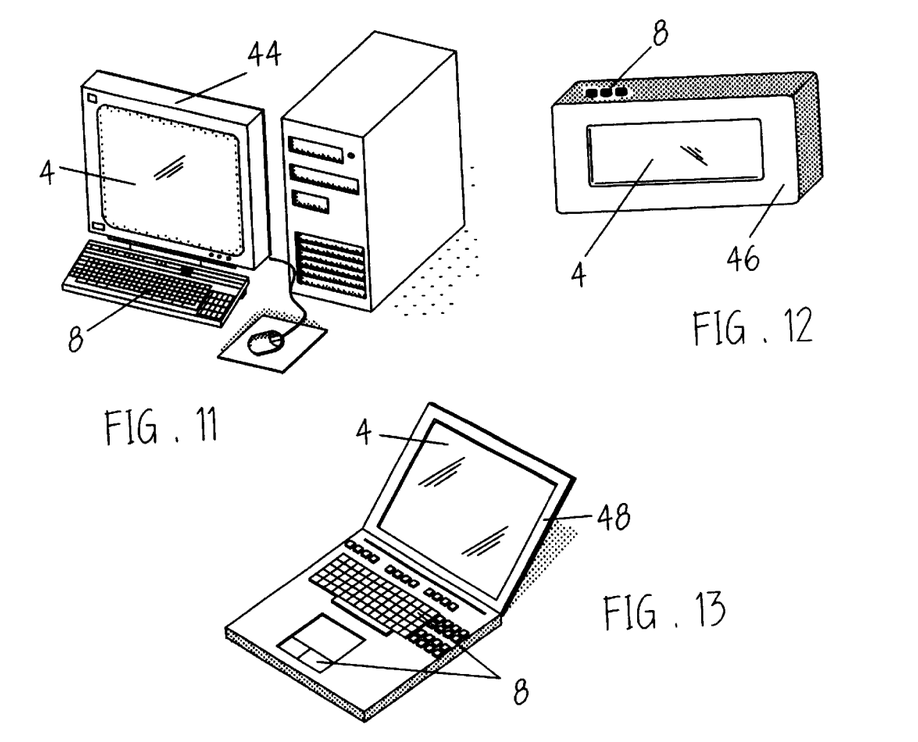
FIG. 11 is a front view of an alternative housing for the present invention having the configuration of a personal computer.
FIG. 12 is a front view of an alternative housing for the present invention having the configuration of a pager.
FIG. 13 is a front view of an alternative housing for the present invention having the configuration of a laptop computer or electronic notebook.
Figure 14:
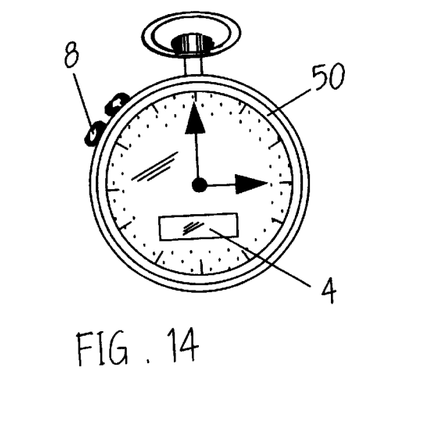
FIG. 14 is a front view of an alternative housing for the present invention having the configuration of a pocket watch.
Figure 15:
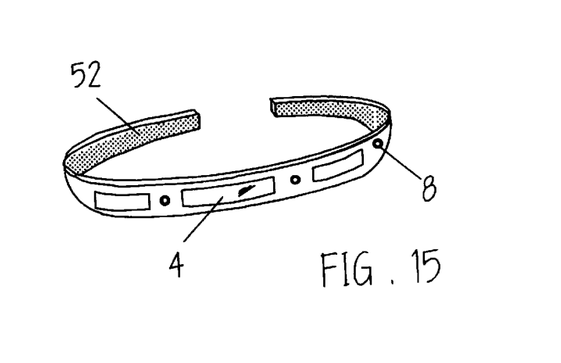
FIG. 15 is a front view of an alternative housing for the present invention having the configuration of a piece of jewelry designed for encircling a body part.

FIGS. 8–15 show alternative housings for the present invention configured for a primary purpose other than behavior modification. Each shows a display panel 4 and at least one operator response/set button 8. FIG. 8 shows the present invention having the configuration of a hand-held electronic organizer, while FIG. 9 shows the present invention having the configuration of a cellular telephone. In addition, FIG. 10 shows the present invention having the configuration of a piece of jewelry suspended from a chain or cord, while FIG. 11 shows the present invention having the configuration of a personal computer. Further, FIG. 12 shows the present invention configured as a pager, FIG. 13 shows the present invention configured within a laptop computer or electronic notebook, FIG. 14 shows the housing of the present invention configured as a pocket watch, and FIG. 15 shows the present invention having the configuration of a piece of jewelry designed for encircling a body part.

Although they would not be part of the simplest, most preferred embodiment of the present invention, several additional non-critical functions could also be made part of the present invention for the convenience of its operator. One such function would be an alternative to complete shut down and allow an operator to hold down response/set button 8 or inner response/set button 22 for various lengths of time to delay activation of signal generation for predetermined time increments, such as successive time periods of fifteen or data. A further non-critical function would be to allow display of visual prompting signals through display screen 4, as well as steady or intermittent display through a light source (not shown) connected through housing 2, 10, 14, or 18, which is independent from display screen 4.

In adapting the present invention for use with personal computers and other electronic devices, various behavior related data could be displayed upon demand through designated operator commands or at least initially upon activation unless operator input cancels such display. It is contemplated for prompting signals to be either in audio, visual, or vibrational form, with operator response input being made by simple keyboard operation, mouse operation, touching the screen in a designated location, or vocalizing an appropriate response. During active computer use, operator prompting signals could comprise a discrete audio signal, display of one or more visual signals, or intermittent visual signal display, or combinations thereof. Each could momentarily interrupt computer use, or be transmitted or displayed concurrently with any other information displayed on the computer at the time of prompting signal generation. Although not limited thereto, it is preferred for visual prompting signals to appear a single location on a computer monitor so that operators are more likely to notice them. The steps for use of the present invention with personal computers will be substantially similar to those identified in FIG. 1 with reasonable allowances being made for computer adaptation. Also, visual prompting signals on a computer monitor could displayed in the form of an icon related to the unwanted behavior that the operator is trying to improve. Adaptation of the present invention to electronic devices other than personal computers could be similar to personal computer applications or in the alternative combined with the housings of the electronic devices similar to the adaptation of the functional devices shown in FIGS. 2–5.

What is claimed is:

1. An interactive reminder system for use by an operator in changing deeply ingrained habits and behaviors that an operator has recognized as unwanted behavior and has a sincere desire to change, which during use provides a succession of prompting signals to the operator on a varied schedule depending upon previous operator input as to achievement in changing the unwanted behavior, to bring the operator successively closer to a targeted behavior modification result, and further which provides such prompting signals at the conclusion of time intervals calculated from information provided by the operator as to whether he or she was engaged in the unwanted behavior at the end of the most recent time interval, in combination with a succession of prior information provided by the operator as to whether he or she was engaged in the unwanted behavior at the end of the time intervals immediately prior to a predetermined number of previously generated prompting signals, said system comprising:

microprocessor means adapted for recursive and iterative calculation of successive time intervals for future operator-prompting signals intended to bring the operator successively closer to a targeted behavior modification result, wherein each said time interval for a next operator-prompting signal is calculated from a succession of electronic operator-generated response signals that includes a predetermined number of previously entered ones of said response signals and also the most recently entered one of said response signals, said microprocessor means also being adapted for increasing a next time interval when the operator is not engaged in a recognized unwanted behavior targeted for improvement at the time of the most recent one of said prompting signals, decreasing a next time interval when the operator is engaged in the recognized unwanted behavior targeted for improvement at the time of the most recent one of said prompting signals, and letting said next time interval remain unchanged when one of said operator response signals is not received after the most recent one of said prompting signals;

housing means adapted for support of said microprocessor means and which is also adapted for a primary functional purpose that is not related to behavioral modification purposes;

signal generation means adapted for providing a prompting signal at the conclusion of each of said calculated time intervals;

information display means connected through said housing;

operator response means adapted for use by an operator to provide at least one electronic response signal to said microprocessor that is capable of being interpreted by said microprocessor for calculation of time intervals, said operator response means also being connected through said housing;

power supply means adapted for providing electrical power to said microprocessor means, said signal generation means, said information display means, and said operator response means; and electrical connection means adapted for electrical communication between said power supply means, said microprocessor means, said signal generation means, said information display means, and said operator response means so that after prompting signal generation and operator engagement of said operator response means, at least one of said electronic response, at least one of said electronic response signals is created by said operator response means to indicate whether the operator was engaged in the recognized unwanted behavior targeted for improvement at the time of the last one of said operator-prompting signals, with each said operator generated electronic response signal being used for calculation of a time interval prior to a next operator-prompting signal, and further with said calculation of time intervals, said prompting signal generation, and operator engagement of said operator response means continuing until the operator determines that the targeted behavior modification result has been achieved.

2. The system of claim 1 wherein said information display means comprises a display panel having a minimum dimension sufficient for display of a date and time.

3. The system of claim 2 wherein said display panel comprises at least one LCD panel.

4. The system of claim 1 wherein said signal generation means is selected from a group consisting of vibrating devices, devices producing audible sounds, devices producing visible displays, and devices capable of producing a confidential signal.

5. The system of claim 1 wherein said operator response means comprises at least one depressible button.

6. The system of claim 1 wherein said operator response means comprises one pair of depressible buttons positioned concentrically relative to one another.

7. The system of claim 1 wherein said housing is selected from a group consisting of wristwatches, pocket watches, writing implements, key chains, jewelry, personal computers, hand-held electronic organizers, electronic notebooks, cell phones, pagers, and laptop computers.

8. The system of claim 1 wherein said operator response means comprises at least one key on a computer keyboard, and said signal generation means is adapted for display on a computer monitor.

9. A behavior modification method for recognized unwanted behavior that is targeted for improvement, said method comprising the steps of providing a reminder system having a microprocessor means adapted for recursive and iterative calculation of successive time intervals for future operator-prompting signals intended to bring an operator successively closer to a targeted behavior modification result, wherein each said time interval for a next operator-prompting signal is calculated from a succession of electronic operator-generated response signals that includes a predetermined number of previously entered ones of said response signals and also the most recently entered one of said response signals, and further whereby a next time interval is increased when the operator is not engaged in a recognized unwanted behavior targeted for improvement at the time of the most recent one of said prompting signals, in the alternative when the operator is engaged in the recognized unwanted behavior targeted for improvement at the time of the most recent one of said prompting signals said next time interval is decreased, and said next time interval remains unchanged when one of said operator response signals is not received after the most recent one of said prompting signals;

also providing said reminder system with a housing means which is adapted for a primary functional purpose that is not related to behavioral modification purposes, signal generation means adapted for providing a prompting signal at the conclusion of each of said calculated time intervals, operator response means adapted for use by an operator to provide at least one electronic response signal to said microprocessor means that is capable of being interpreted by said microprocessor means for calculation of time intervals, power supply means, and electrical connection means adapted for electrical communication between said power supply means, said microprocessor means, said signal generation means, said information display means, and said operator response means;

engaging said operator response means to initialize said reminder system;

repeated monitoring of current time by said microprocessor means until sufficient time has elapsed that the beginning of a period of active behavior monitoring is reached;

when said period of active behavior monitoring is reached automatic entry of said reminder system into a prompting signal generation mode;

said microprocessor means initially using a factory-set predetermined interval for generation of a first prompting signal and after said first prompting signal generation, said microprocessor means using a predetermined number of successive prior prompting signal intervals to calculate the time interval of a next prompting signal, including the time interval prior to the most recent one of said prompting signals;

after said first prompting signal is generated, using said operator response means to create one of said response signals to indicate whether the recognized unwanted behavior targeted for improvement occurred immediately prior to the time of said prompting signal generation;

said microprocessor means automatically calculating a time interval for next signal generation based upon a predetermined number of successive prior prompting signal intervals that include the time interval prior to the most recent one of said prompting signals, and whereby said microprocessor means increases said time interval for next signal generation when the operator is not engaged in a recognized unwanted behavior targeted for improvement at the time of the most recent one of said prompting signals, said microprocessor means decreases said time interval for next signal generation when the operator is engaged in the recognized unwanted behavior targeted for improvement at the time of the most recent one of said prompting signals, and said microprocessor means does not change said time interval for next signal generation when one of said operator response signals is not received after the most recent one of said prompting signals;

said microprocessor means repeating said calculation of time intervals for generation of a next prompting signal and said signal generation means repeatedly providing a next prompting signal at the end of each said time interval so as to bring the operator successively closer to a targeted behavior modification result until the operator determines that the targeted behavior modification result has been achieved; and engaging said operator response means to enter a shut down command that turns off said reminder system.

10. The method of claim 9 further comprising the step of using the one of said prompting signal intervals pending at shut down as the prompting signal interval used upon reactivation of said system.

11. The method of claim 9 wherein said step of creating a first prompting signal further comprises the creation of a first prompting signal within two hours of said step of system activation.

12. The method of claim 9 wherein said step of using said operator response member to create said response signals must be completed within a time period of approximately ten seconds for said microprocessor to use said signals in said calculation of a next prompting signal interval.

13. The method of claim 9 further comprising the step of shutting down said system being able to occur at any time by prolonged engagement of said operator response means for a predetermined period of time greater than three seconds.

14. The method of claim 9 wherein said step of automatic display includes the display of a microprocessor calculated progress graph.

15. The method of claim 9 wherein said step of automatic display includes the display of a microprocessor calculated recent interval average.

16. The method of claim 9 wherein said step of time interval calculation for next signal generation by said microprocessor is based upon a minimum of fifty of said most recent ones of said operator responses so as not to unduly penalize an operator for having a short time period of inattention to behavior modification goals.

17. The method of claim 9 wherein said step of providing said reminder system farther comprises the providing of a reminder system having information display means adapted for display of generation of information relating to behavior modification, and firther comprising the steps of engaging said operator response member to enter into a set-up mode, said microprocessor means generating behavior modification information relating to in a format for display through said information display means, and review of said displayed behavior modification information.

18. The method of claim 17 further comprising the step of engaging said operator response means to interrupt said automatic display and input data.

19. The method of claim 9 further comprising the step of engaging said operator response means to reset factory default settings in said reminder system.

20. The method of claim 9 further comprising the step of engaging said operator response means to reset said period of active behavior modification for said reminder system.

* * * * *